(12) United States Patent
Fuse et al.

(10) Patent No.: US 6,938,447 B2
(45) Date of Patent: Sep. 6, 2005

(54) APPARATUS AND METHOD OF CORRECTING DEFORMATION OF GAS TURBINE BLADE

(75) Inventors: Toshiaki Fuse, Shinjuku-Ku (JP); Daizo Saito, Yokohama (JP); Yomei Yoshioka, Yokohama (JP); Masahiro Hiragishi, Yokohama (JP); Junji Ishii, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 10/603,805

(22) Filed: Jun. 26, 2003

(65) Prior Publication Data

US 2004/0035163 A1 Feb. 26, 2004

(30) Foreign Application Priority Data

Jun. 26, 2002 (JP) ........................................ 2002-185694
Jun. 23, 2003 (JP) ........................................ 2003-178721

(51) Int. Cl.⁷ ............................. B21D 3/16; B21D 53/78
(52) U.S. Cl. ............................ 72/21.5; 72/21.1; 72/414; 29/889.1; 29/889.23
(58) Field of Search ................................. 72/20.1, 21.1, 72/21.5, 412, 414; 29/889.1, 889.23, 889.7

(56) References Cited

U.S. PATENT DOCUMENTS

| | | | | |
|---|---|---|---|---|
| 3,372,099 A | * | 3/1968 | Clifford | 205/641 |
| 3,621,700 A | * | 11/1971 | Wachtell | 72/309 |
| 4,188,811 A | * | 2/1980 | Brimm | 72/63 |
| 4,291,448 A | * | 9/1981 | Cretella et al. | 29/889.1 |
| 5,060,375 A | * | 10/1991 | Demichel | 29/889.21 |
| 5,063,662 A | * | 11/1991 | Porter et al. | 148/671 |
| 5,713,233 A | * | 2/1998 | McCarthy et al. | 72/31.02 |

FOREIGN PATENT DOCUMENTS

| | | |
|---|---|---|
| EP | 1 310 632 | 5/2003 |
| GB | 1 046 297 | 10/1966 |
| GB | 1 295 899 | 11/1972 |
| GB | 2 009 635 | 7/1979 |
| GB | 2 073 631 | 10/1981 |
| GB | 2 080 156 | 2/1982 |
| GB | 2 091 139 | 7/1982 |
| GB | 2 094 691 | 9/1982 |
| JP | 8-276216 | 10/1996 |
| RU | 303125 | 6/1971 |

\* cited by examiner

*Primary Examiner*—Daniel C. Crane
(74) *Attorney, Agent, or Firm*—Oblon, Spivak, McClelland, Maier & Neustadt, P.C.

(57) ABSTRACT

An apparatus for correcting deformation of a gas turbine blade includes a stationary die fixed to a backside of a tip shroud of a gas turbine blade to hold a back surface thereof and a pressing die pressing a front surface of the tip shroud so as to press the tip shroud of the blade between the pressing die and the stationary. A hydraulic drive mechanism including pressure generator is arranged for pressing the pressing die against the tip shroud held by the stationary die and a control device is operatively connected to the hydraulic drive mechanism so as to set and indicate a driving condition on a basis of deformation correction data preliminarily stored in the control device.

12 Claims, 14 Drawing Sheets

APPARATUS AND METHOD OF CORRECTING DEFORMATION OF GAS TURBINE BLADE

BACKGROUND OF THE INVENTION

1. Industrial Field of the Invention

The present invention relates to apparatus for and method of correcting deformation of a gas turbine blade, capable of correcting or adjusting the deformation of a tip shroud of the gas turbine blade used for a generator by using a press.

2. Related Art

Gas turbine blades for generators are used under severe conditions, and for this reason, the material of the gas turbine blades deteriorates and deforms during a long time operation. Since the gas turbine blade is made of expensive heat resisting alloy, it is desirable in an economical viewpoint to repair and reuse deteriorated or deformed gas turbine blade as much as possible without discarding or newly manufacturing the blade. Regeneration by an HIP (Hot Isostatic Pressing) material reproduction treatment has been tried with respect to the material deterioration, and some extent of effect has been obtained.

On the other hand, without carrying out the correction to the deformation, the arrangement of circumferentially arranged gas turbine blades are changed so that adjustment is made to prevent the contact area of a tip shroud of adjacent gas turbine blades from becoming too small.

The deterioration of the material can be regenerated in some extent by employing the HIP material regeneration treatment. However, as the HIP material regeneration treatment utilizes an isotropic pressing technology by using gas, it is impossible to correct the deformation. Then, the arrangement of gas turbine blades is adjusted in consideration that the contact area of the tip shroud of the adjacent gas turbine blades does not become too small. Therefore, much time and cost are taken to adjust the arrangement, and even if the contact area is secured by the adjustment, it is difficult to entirely adjust the balance of gas turbine blades. In addition, there is the case where the contact area is not secured even if these gas turbine blades are suitably arranged as much as possible. In such a case, an expensive and new gas turbine blade must be applied to the portion difficult to adjust.

In the known art concerning such turbine blade deformation correction, at the time of manufacturing steam turbine blade or gas turbine blade through casting process, the correction of "twist distortion (strain)" or "bent distortion (strain)" caused particularly to an effective portion (i.e., portion at which steam or combustion gas as operation gas flows) of the blade has been performed by fixing the blade itself to a large-scale press and pressing thereby the blade (effective portion) from front and rear sides thereof. (For example, refer to Japanese Patent Laid-open No. HEI 6-262262 and No. HEI 8-276216).

However, in such prior art, the correction is mainly made to correct or adjust the distortion of the blade at newly manufacturing process or distortion only to the blade effective portion, and accordingly, it was difficult to apply such correction technology to the deformation of the blade tip shroud.

SUMMARY OF THE INVENTION

An object of the present invention is to substantially eliminate defects or drawbacks encountered in the prior art mentioned above and to provide apparatus for and method of simply and easily correcting a deformation of a tip shroud of a gas turbine blade.

This and other objects can be achieved according to the present invention by providing, in one aspect, an apparatus for correcting deformation of a gas turbine blade comprising:

a stationary die fixed to a backside of a tip shroud of a gas turbine blade to hold a back surface thereof when deformation of the tip shroud of a gas turbine blade is corrected;

a pressing die pressing a front surface of the tip shroud so as to press the tip shroud of the blade between the pressing die and the stationary die;

a supporting mechanism for supporting the stationary die with respect to the pressing die;

a hydraulic drive mechanism connected to the pressing die and including pressure generator for pressing the pressing die against the tip shroud held by the stationary die; and a control device operatively connected to the hydraulic drive mechanism and adapted to set and indicate a driving condition of the hydraulic drive mechanism on a basis of deformation correction data preliminarily stored in the control device.

In the deformation correction (correcting) apparatus for gas turbine blade of this aspect, when the deformation of the tip shroud of a gas turbine blade is corrected, the pressing die presses the surface of the tip shroud against the stationary die, and then, the tip shroud is pressed between the stationary die and the pressing die under the control of the pressure and displacement of the pressure applying device according to a predetermined data or like to thereby correct the deformation.

In a preferred embodiment, the surface of the stationary die contacting the tip shroud of the blade has a shape subtracting a return amount from the shape of the tip shroud after the correction of the deformation, and on the other hand, the surface of the pressing die contacting the tip shroud has a shape adding a return amount to the shape of the tip shroud after the correction of the deformation.

Furthermore, the preliminarily stored data includes data of pressure and displacement to be outputted to the pressure generator of the hydraulic drive mechanism, the control device includes a pressure operating element and a displacement operating element, and the return amounts are operated and set by the pressure operating element and the displacement operating element based on a predetermined data with a position of the pressing die contacting the deformed portion of the tip shroud being a reference position.

According to this embodiment, the surface of the stationary die contacting the tip shroud has a shape subtracting a return amount from the shape of the tip shroud after the correction of the deformation. Therefore, the return amount of elastic deformation can be properly corrected. Moreover, in addition to this effect, since the surface of the die contacting the tip shroud has a shape adding a return amount to the shape of the tip shroud after the correction of the deformation, the return amount of elastic deformation can be properly corrected. Furthermore, the deformation correction of the blade can be done in suitable consideration of the return amounts after correction by means of the pressure calculator and displacement calculator of the control device on the basis of the preliminarily stored data particularly concerning the pressure and the displacement.

In the other embodiments, the pressing die may be composed of a plurality of divided sections, and the pressure generator includes a plurality of pressing devices corresponding to the divided sections of the pressing die so as to press the respective divided sections independently in accordance with setting conditions set for the divided sections, respectively successively.

The stationary die may be also composed of a plurality of divided sections so as to correspond to the divided sections of the pressing die, and the hydraulic drive mechanism further includes a pressure generator including a plurality of pressing devices corresponding to the divided sections of the stationary die so as to press the respective divided sections thereof independently in accordance with setting conditions set for the divided sections, respectively successively.

Accordingly, the divided each pressing die section is independently pressed successively against the surface of the tip shroud so as to correct the deformation. Therefore, the pressing does not concentrate on the deformed portion and no crack occurs therein. Moreover, the divided each stationary die section is independently pressed successively against the backside of the tip shroud so as to correct the deformation. Thus, various deformed shapes can be corrected.

Furthermore, the pressing die may be constructed to have a convex portion contacting the tip shroud and the hydraulic drive mechanism includes a pressure generator for pressing the pressing die so that the convex portion contacts a portion of the tip shroud of the blade and also includes a moving device for horizontally moving the pressing die along an entire surface of the tip shroud while being pressed to thereby correct the deformation of the tip shroud during the movement.

The pressing die contacting the tip shroud may be constructed to have convex surface and the hydraulic drive mechanism includes a pressure generator for pressing the pressing die so that the pressing surface thereof rolls along an entire surface of the tip shroud by moving a loading point of the pressing die against the tip shroud surface.

According to such embodiments, the convex portion of the moving die is pressed against the tip shroud while contacting a portion of the surface of the tip shroud and is gradually moved along the entire surface of the tip shroud so as to correct the deformation of the tip shroud. Therefore, the deformed portion is corrected ranging from the central portion to the distal portion without using a complicated die.

Furthermore, the load applying position of the pressing die is gradually moved while the convex surface is gradually moved (rolls) in position contacting the surface of the tip shroud to correct the deformation of the tip shroud. Therefore, pressing force does not concentrate on the deformed portion, and scratches by rubbing in the movement are hard to occur at the pressing operation.

In another aspect of the present invention, there is also provided a method of correcting deformation of a gas turbine blade comprising the steps of:

inspecting presence or absence of deformation of a tip shroud of a gas turbine blade;

judging whether the deformed portion of the tip shroud is to be corrected or not;

softening a blade to which it is judged that the deformation correction is needed;

fixing a stationary die for holding a back surface of the tip shroud to the gas turbine blade on the back side of the tip shroud;

setting a pressing die pressing a front surface of the tip shroud so as to be movable under pressure and stop at a time of contacting the tip shroud; and pressing the tip shroud against the stationary die from the time of contacting the tip shroud.

The method may further includes the step of judging presence or absence of the displacement of the pressing die when pressed and continuing the correction working in the judgment of presence or stopping the correction working in the judgment of absence.

In the deformation correcting method for gas turbine blade described above, the deformation of the tip shroud of the gas turbine blade can be operated and processed including calculation process in accordance with the past experience data and experiment data, in addition to the return amount due to pressing of the pressing die. Moreover, the softening treatment is carried out with respect to the tip shroud of the gas turbine blade, and thereafter, the deformation of the tip shroud is corrected. Therefore, it is possible to prevent crack occurring in the correction of the deformation.

Furthermore, an HIP material regeneration treatment and solid solution aging heat treatment may be further carried out with respect to the entire gas turbine blade after the correction of the deformation of the tip shroud. Accordingly, even if micro defect occurs in the inside of the gas turbine blade, the defect could be eliminated.

The nature and further characteristic features of the present invention will be made more clear from the following descriptions made with reference to the accompanying drawings.

DESCRIPTION OF THE PREFERRED EMBODIMENTS

Preferred embodiments of the present invention will be described hereunder with reference to the accompanying drawings.

Figure 1:
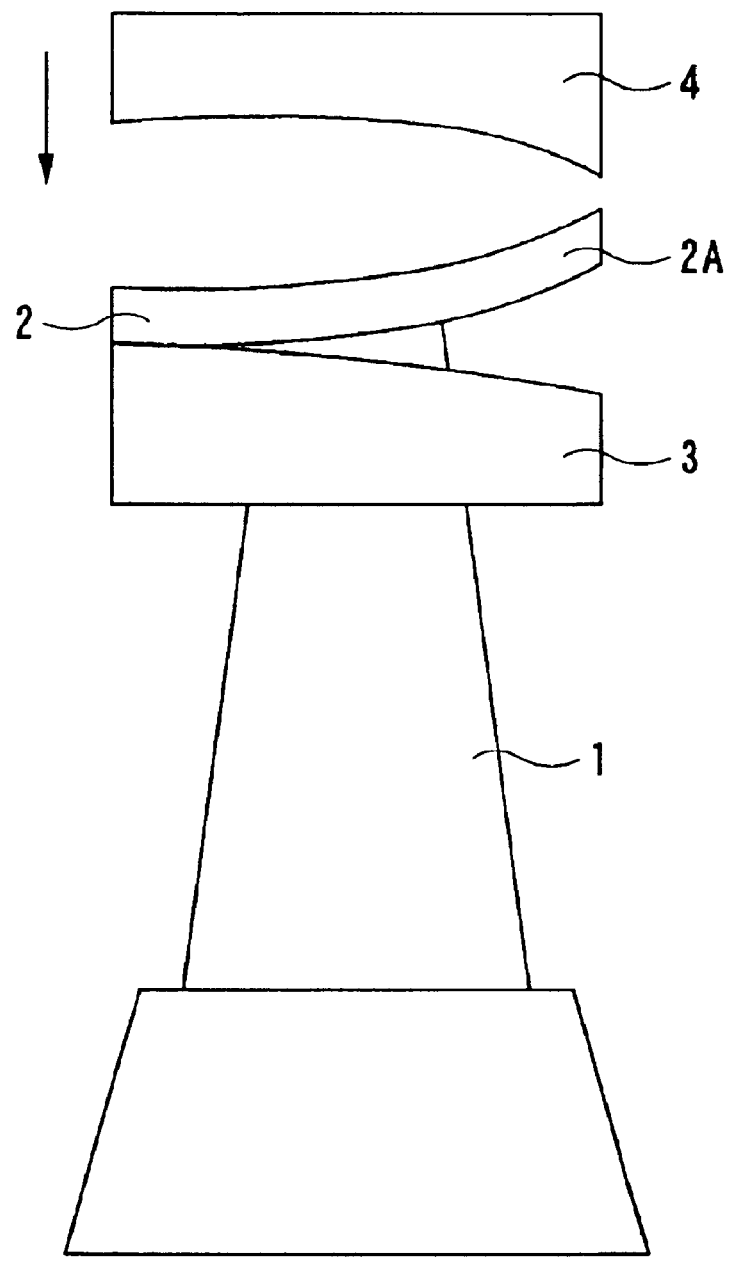
FIG. 1 is a view showing the structure of a deformation correcting section of the deformation correction apparatus for a gas turbine blade according to the first embodiment of the present invention.

Referring to FIG. 1 representing the first embodiment of the blade deformation correction apparatus of the present invention, the deformation correction apparatus includes a stationary die 3 for fixing a tip shroud 2 of a gas turbine blade 1 and a pressing die 4 for pressing the tip shroud 2. The stationary die 3 is arranged to a lower side of the pressing die 4 at the time of deformation correction. In order to correct a deformed portion 2A of the tip shroud 2, the tip shroud 2 is pressed between the stationary die 3 and the die 4 so that the deformed portion 2A can be corrected so as to provide a flat shape.

When correcting the deformed portion 2A of the tip shroud of the gas turbine blade 1, the gas turbine blade 1 is held between stationary die 3 (composed of two sections for front and back side surfaces of the blade) to be entirely fixed thereto. That is, the stationary die 3 has a two-divided structure, and the inner surfaces of the divided two stationary die sections are formed so as to correspond to a shape of the blade directly below the tip shroud. Thus, the stationary die 3 holds the gas turbine blade of the tip shroud 2 at a lower portion thereof between the inner surfaces of the two die sections, which are fixed to the deformation correction apparatus.

Figure 3:
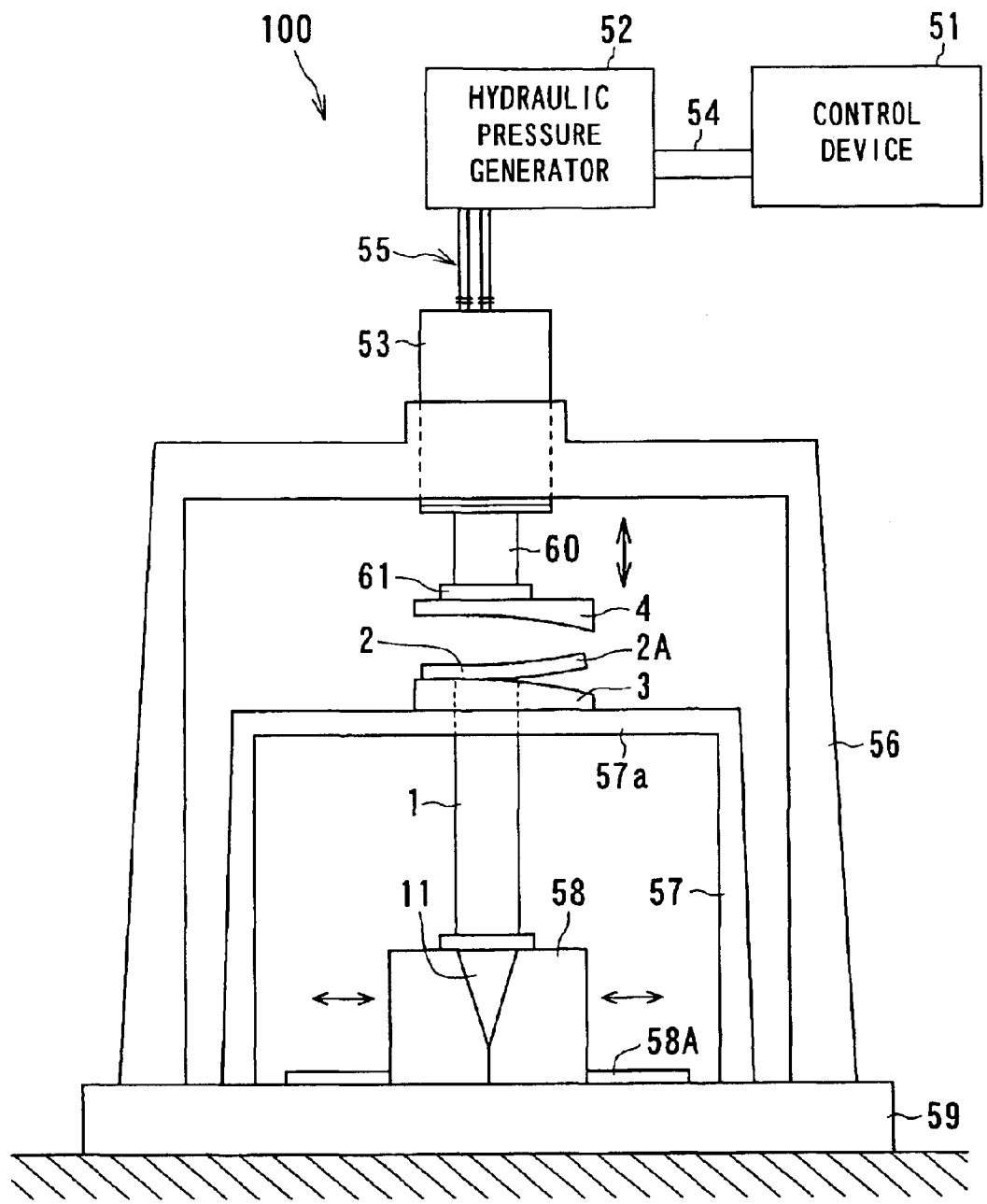
FIG. 3 is a schematic view showing an entire structure of the deformation correcting apparatus for a gas turbine blade according to the first embodiment of the present invention.

The stationary die 3 holding the gas turbine blade 1 is placed on a fixed table of a portal press shown in FIG. 3. The pressing die 4 is attached to a movable portion of the portal press and the press is actuated so that the pressing die 4 contacts the deformed portion 2A. The contacting position is set as a relative reference position.

When the pressing die 4 is further depressed downward, the contact surface is pressed against the warped-up deformed portion 2A, so that the deformed portion 2A is elastically deformed. In this case, a displacement transducer, not shown, measures the descent from the reference position, and the press is moved up after the pressing die 4 descends to a predetermined position. Then, the gas turbine blade 1 is taken out of the stationary die 3, and the deformation correcting operation ends.

When correcting the deformed portion 2A of the tip shroud 2 into a flat surface, the press is released after the deformed portion 2A of the tip shroud 2 is made flat by the operation of the pressing die 4. In such operation, although the plastic deformation is corrected, there exist return of elastic deformation, so-called a spring-back, and the deformation has been still left. Then, the surface of the stationary die 3 abutting against the tip shroud 2 is set as a curved surface subtracting the return amount from the final corrected shape, that is, the flat surface. This curved surface may be a surface further bend from a predetermined curved surface. Likely, the pressing die 4 has a shape adding the return amount to the flat surface.

Figure 4A:
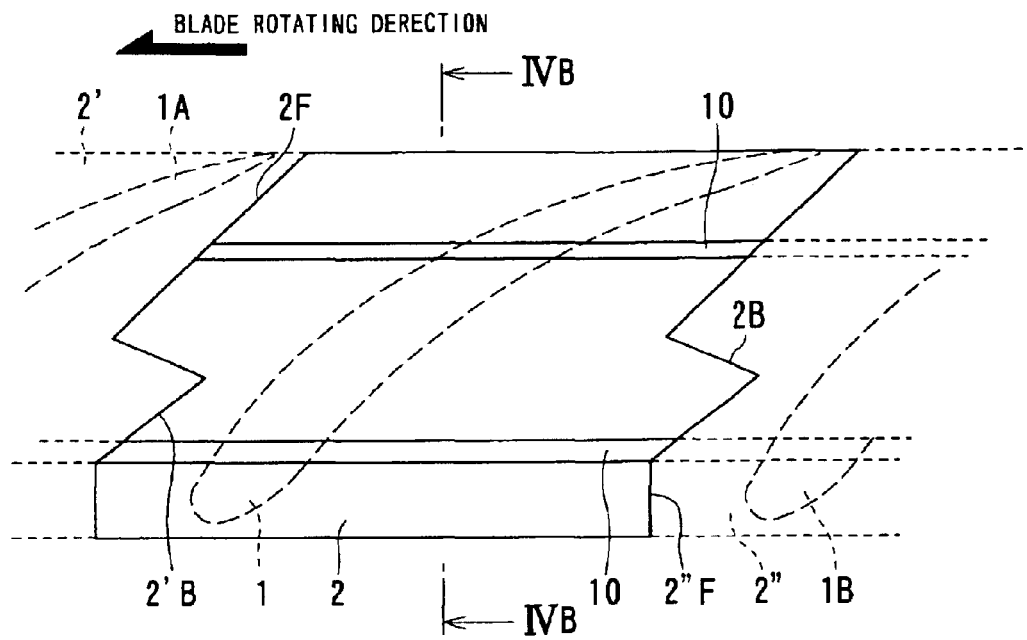
FIG. 4A is a schematic view showing a shape of the tip shroud of the gas turbine blade to which the deformation correction apparatus of the first embodiment is applicable and FIG. 4B is a sectional view taken along the line IVB—IVB in FIG. 4A.
Figure 4B:
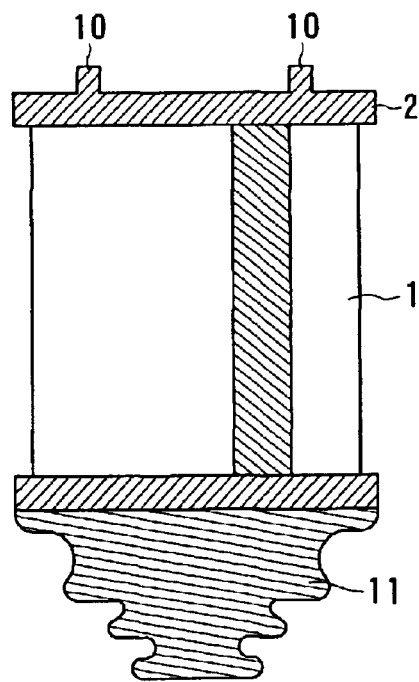

With reference to FIG. 4, showing the tip shroud shape of the gas turbine blade to which the deformation correction apparatus of the present invention is applicable, in the gas turbine blade 1, a preceding end face 2F of the tip shroud 2 of the blade 1 in the rotating direction contacts a following end face 2'B of a tip shroud 2' of another gas turbine blade 1A arranged on the preceding side of the blade 1. In the same manner, a following end face 2B of the tip shroud 2 of the blade 1 in the rotating direction contacts a preceding end face 2"F of a tip shroud 2" of another gas turbine blade 1B arranged on the following side of the blade 1. Vibration of the blades can be prevented by friction force due to such contactings of the tip shrouds.

In a case where a gas turbine plant provided with such gas turbine blades is operated for a long period, especially, a portion of the tip shroud 2 on the following end face 2B side of the gas turbine blade 1B will be deformed due to the repeated contacts between the following end face 2B of the gas turbine blade tip shroud 2 and the preceding end face 2"F of the other blade tip shroud 2 and due to temperature difference on both upper and lower surfaces of the tip shrouds 2.

Furthermore, a plurality of seal fins 10 are provided for the upper portions of the tip shrouds 2 of the gas turbine blades 1 for preventing an operation fluid such as combustion gas from leaking through the front end portions of the blades. In addition, since the gas turbine blade 1 is exposed to high temperature atmosphere for a long time during its running period, the surface material or substance of the blade is oxidized or nitrated, and especially, the seal fin portions became likely cracked. Because of this reason, when the deformation of the tip shroud is corrected merely by using the press, the seal fins 10 may be cracked and it is obliged to exchange the blade with new one.

Taking the above facts into consideration, according to the present invention, in order to prevent the causing of such cracks, when the deformation of the gas turbine blade 1 is corrected, moment force loaded and displacement applied to the deformed portion are always monitored, a spring-back amount is grasped on the basis of data preliminarily obtained through experiments, and a pressing force to be applied is controlled. Further, in a case where the displacement necessary for a predetermined constant pressure obtained from the experiment data is not obtained, the pressing process is not applied (stops).

FIG. 2 shows deformation correction steps according to the first embodiment.

Figure 2A:
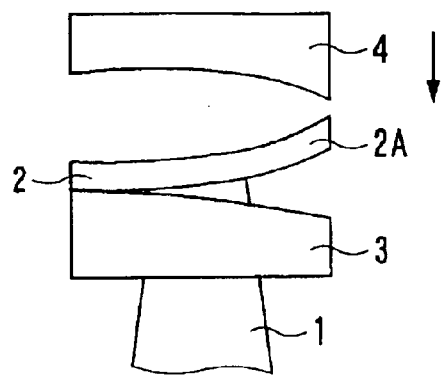
FIG. 2 is a view explaining the operating process of correcting deformation of a tip shroud by the deformation correcting apparatus of FIG. 1, which includes FIGS. 2A to 2C showing the respective operations.

FIG. 2A shows a state that the pressing die 4 is lowered towards the tip shroud 2 of the gas turbine blade 1 which is secured to the stationary die 3. In this step, the lowering motion is once stopped at a moment when the pressing die 4 contacts the deformed portion 2A (upwardly deformed) of the tip shroud 2. The position of the pressing die 4 at this moment is stored. Thereafter, a pressure is further applied slowly to the pressing die 4 so as to continue the deformation correction step to thereby lower the pressing die 4. The deformation of the portion 2A is to be confirmed. In this operation, when the pressing die 4 does not indicate any deformation, the operation stops because of possibility of occurrence to certain abnormality.

Figure 2B:
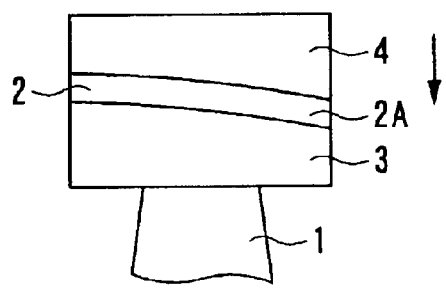

Next, FIG. 2B shows a state that the upwardly deformed portion 2A of the tip shroud 2 is depressed by the pressing die 4. In this state, as shown, the deformed portion 2A of the tip shroud 2 is depressed downward further from a horizontal level in consideration of return amount of the elastic deformation.

Figure 2C:
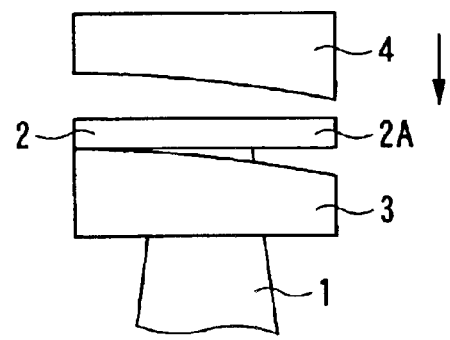

FIG. 2C shows a state that the pressing force is released and the pressing die 4 is returned upward. In this state, since the deformed portion 2A of the tip shroud 2 is pressed by an extra amount in consideration of the return amount, the deformed portion 2A of the tip shroud 2 provides a flat shape which is finally desired after the removal of the pressing force by the pressing die 4.

A deformation correction (correcting) apparatus, according to the fist embodiment, for carrying out the steps or operations mentioned above will be explained hereunder with reference to FIG. 3.

With reference to FIG. 3, the deformation correction apparatus 100 of the present embodiment generally comprises the stationary die 3 to which the tip shroud 2 of the gas turbine blade 1 is secured, the pressing die 4 adapted to press the tip shroud 2, a supporting mechanism 56, 57 for supporting the stationary and pressing dies 3, 4, a hydraulic drive mechanism 52, 53 for driving the pressing die 4, and a control system or device 51 for controlling the operation of the hydraulic drive mechanism.

In more detail, the pressing die 4 is secured to a flange 61 formed to the front end portion of a piston 60 reciprocally moving in a hydraulic cylinder 53 supported by an outside support column 56. On the other hand, the stationary die 3 is fixed to a horizontal beam 57a of an inside support column 57 and adopted to support the tip shroud 2 when pressing the deformed portion 2A thereof as well as support the blade 1 from the lower surface side of the tip shroud 2. A stud 11 provided for a portion of the blade 1 on the end side opposite to the location of the tip shroud 2 is snapped and fastened, in an embedded state, between stud chuck 58 which is moved on a rail member 58A, to be opened or closed, disposed on a fixing base 59. Since the gas turbine blade 1 is secured by the stationary die 3 and the stud chuck 58, the entire blade 1 is not deformed even if pressure by the hydraulic cylinder 53 is applied. The hydraulic cylinder 53 is operated, through a hydraulic control duct(s) 55, by the hydraulic pressure generator 52 generating a pressure suitable for the blade 1 to be corrected in response to various control signals from the control device 51 through a control bus 54. The piston 60, the hydraulic cylinder 53, the pressure generator 52 and the ducts or like 55, 54 constitute the hydraulic drive mechanism for driving the pressing die 4.

In the deformation correction apparatus 100 of the structure mentioned above, the hydraulic pressure generator 52 gives pressure and/or displacement force necessary for carrying out the deformation correction process to the hydraulic cylinder 53 through the piston 60 and then to the pressing die 4 in response to various control signals from the control device 51.

On the other hand, the gas turbine blade 1 is fixed at its tip shroud lower surface and embedded stud 11, only the deformed portion 2A can be corrected without influencing other portions. Further, the outside and inside support columns 56 and 57 are firmly secured to the base 59, so that the dies 3 and 4 can be driven at the deformation correction working without being adversely affected even by a large pressure applied by the hydraulic cylinder 53.

Figure 5:
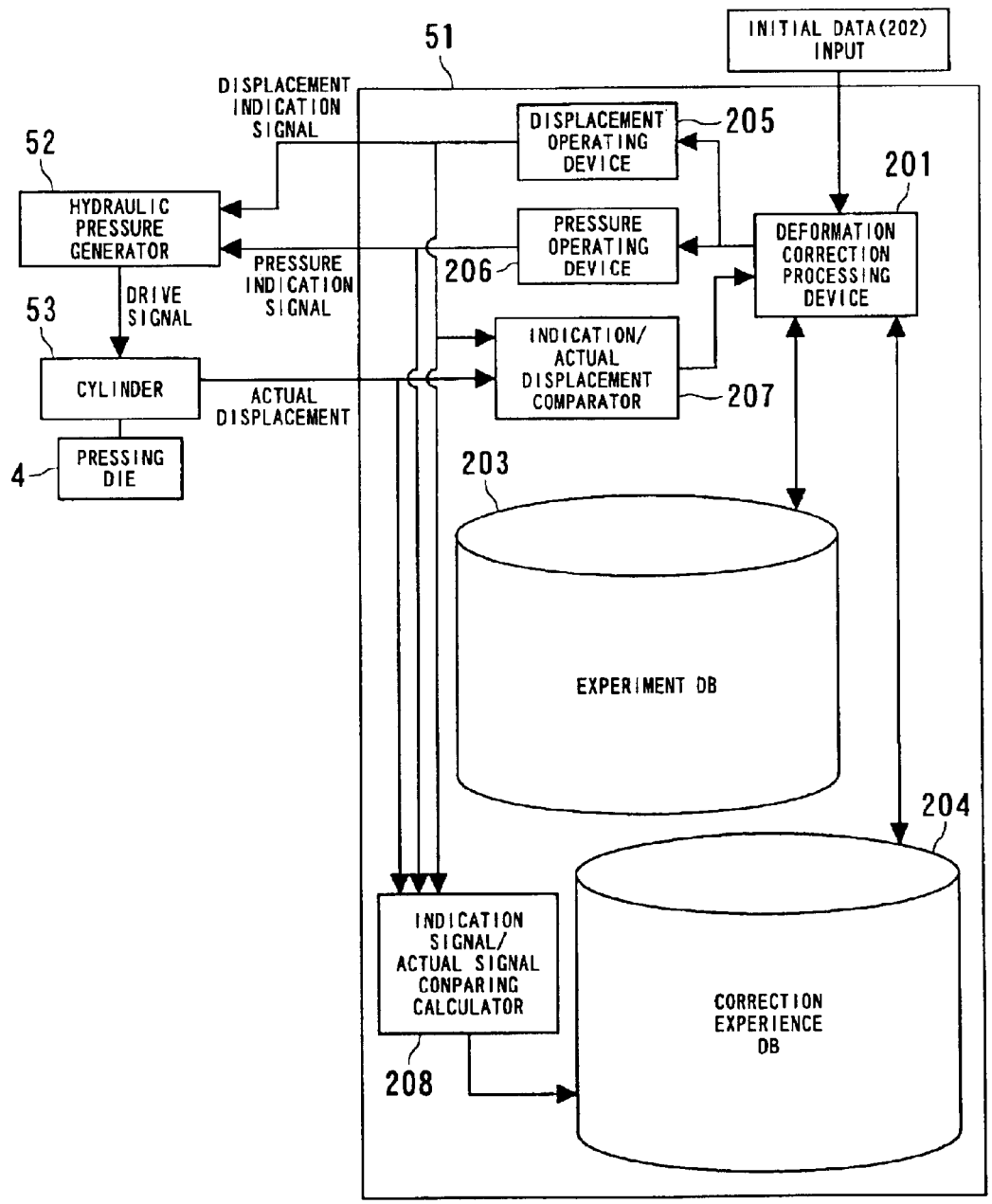
FIG. 5 is a block diagram of a control device of the turbine blade deformation correction apparatus of the first embodiment of FIG. 3.

FIG. 5 shows a detail structure of the control device 51.

With reference to FIG. 5, at the time of starting the deformation correction working to the gas turbine blade 1, an initial data 202, for example, concerning deformed amount, material of blade, deformation correction history and so on, is first inputted into a deformation correction processing device (element) 201 arranged inside the control system or device 51 through an inputting device such as key-board. The deformation correction processing device 201 operating device 201 indexes an experiment data base (DB) 203 and a correction experience data base (DB) 204, preliminarily stored, in accordance with the initial data 202 mentioned above and, in accordance with the most suitable experiment data or past deformation correction data, information (data) regarding displacement and pressure are derived and transmitted to displacement operating device (calculator) 205 and pressure operating device (calculator) 206, which are then operated in accordance with the data from the deformation correction processing device 201 and then transmit signals representing the data through the operation of the piston 60 of the hydraulic cylinder 53 by the hydraulic pressure generator 52.

When the blade deformation correction working starts, the data of actual displacement through the contact of the pressing die 4 to the deformed portion 2A of the tip shroud 2 is sequentially transmitted as feedback data to an indication/actual displacement comparator 207 of the control device 51.

In the indication/actual displacement comparator 207, indication signals from the displacement operating device 205 and pressure operating device 206 are compared with signals representing the actual displacement from the hydraulic cylinder 53, and the compared result (data) is then transmitted to the deformation correction processing device 201, in which the comparison with the experiment data base 203 and the correction experience data base 204 is again performed. In this comparison, in case a large difference therebetween be found, a signal for stopping the working is transmitted.

On the other hand, the data transmitted from the displacement operating device 205 and the pressure operating device 206 to the hydraulic pressure generator 52 are branched immediately after the transmitting and then inputted respectively to an indication signal/actual signal comparing calculator 208, into which the actual displacement data is also inputted from the cylinder 53. The indicated displacement and pressure data and their feedback data from the indication signal/actual signal comparing calculator 208 are stored in the correction experience DB 204 together with the initial input data in the deformation correction processing device 201. The data stored in this correction experience DB is referred to in deformation correction working of the same gas turbine blade which will be again performed in future.

Further, as concrete data of the experiment DB 203, there will be listed up: data of a return amount (spring-back amount) with respect to the displacement applied to the deformed portion 2A by the pressing die 4; data of elastic deformation or plastic deformation caused to the deformed portion 2A at the time of applying a load (pressing time) of the pressing die 4; and other data, which will include data concerning the actual experiment or numerical analysis.

On the other hand, the concrete data of the correction experience DB 204 may include data of return amount (spring-back amount) with respect to the deformation given to the deformed portion 2A by the pressing die 4, and data of displacement indication amount, pressure indication amount, material, operation time, blade length, plant name, tip shroud shape, and so on, in addition to the data of elastic deformation or plastic deformation caused to the deformed portion 2A at the time of applying a load (pressing time) of the pressing die 4.

According to the first embodiment, the backside of the tip shroud 2 is fixed by using the stationary die 3, and the embedded stud 11 of the blade 1 is also fixed. Therefore, the correction working can be done stably regardless of the blade length, and the turbine blade 1 can be readily fixed to the stationary die 3. Further, since the warped-up deformed portion 2A of the tip shroud 2 is corrected, there is no need of adjusting the arrangement of the gas turbine blades in order to secure the contact area of the gas turbine blades 1. Furthermore, it is possible to recycle the gas turbine blades 1, without discarding, which have been discarded because of the reason that the contact area is not secured even if the arrangement is adjusted.

Since the return due to the elastic deformation in the shape of the stationary die 3 and the pressing die 4 is taken into consideration in accordance with the preliminarily stored experiment data, a desired shape is obtainable after the pressing has been released. In addition, since the pressure at the pressing time is controlled and the minimum deformation is only given to obtain the predetermined final shape, crack which may be generated by the extra deformation will be effectively prevented. That is, this embodiment may be especially applicable to the tip shroud the deformation of which is relatively small to the extent that the deformation can be corrected by one pressing operation.

Figure 6:
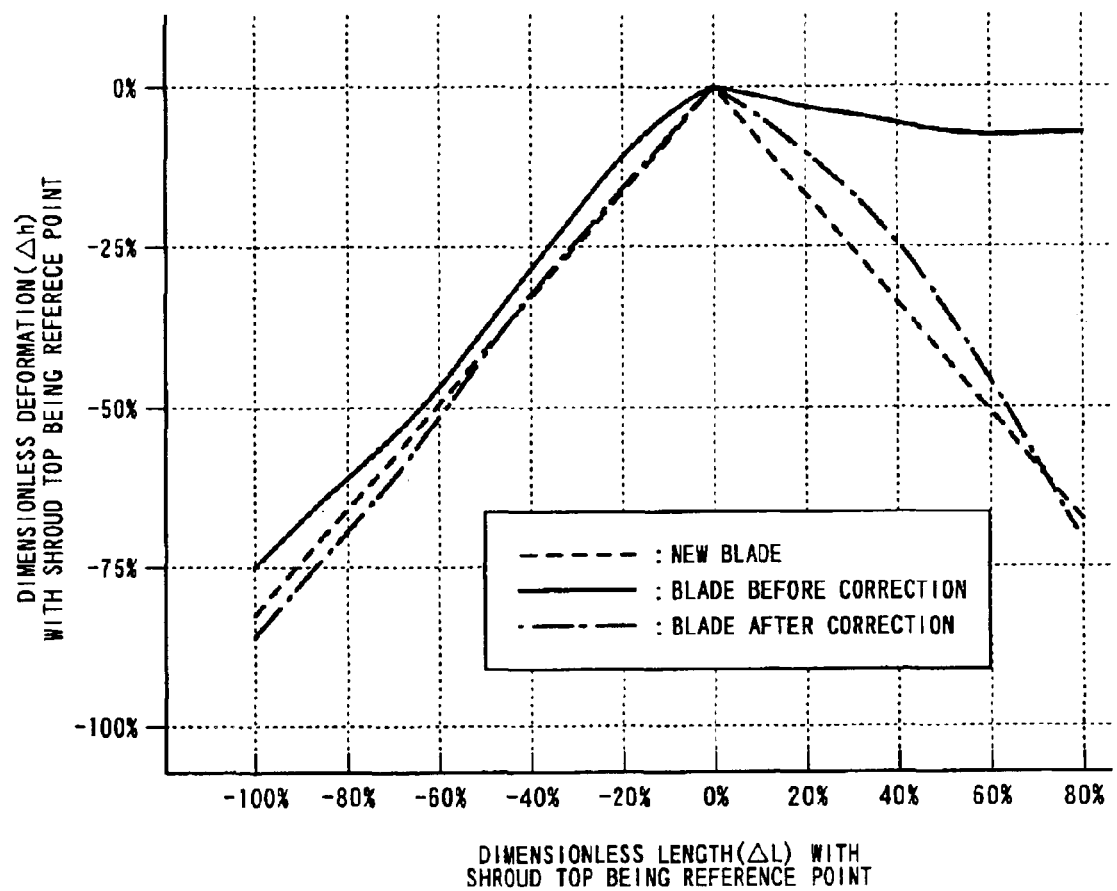
FIG. 6 is a view representing the change in shape of the gas turbine blade, before and after the deformation correction, to which the present invention is applied.

FIG. 6 shows the shape change of the gas turbine blade, before and after the deformation correction, to which the first embodiment of the present embodiment is applied. The axis of ordinate represents deformation amount (percentage) at respective portions with reference to the top point of the tip shroud 2 and the axis of abscissa represent front and rear distances (percentage) from the top position (reference point) of the tip shroud 2.

With reference to FIG. 6, the deformation of the tip shroud 2 of the blade 1 at a time of being newly manufactured is shown with dotted line, in which the tip shroud 2 shows a mount shape viewed from rotational surface of the blade 1. The solid line shows the deformation amount before correction of the tip shroud of the blade used for a long time, from which it is found that the tip shroud 2 is largely deformed on one side from the top point in comparison with the newly manufactured blade. Furthermore, the dot-and-dash line shows the deformation amount, after correction by using the deformation correction apparatus of the present invention, of the tip shroud from which it is found that the shape as that of the tip shroud returns almost the same shape of the new one. In addition, it will be also found that other deformed portions not so largely deformed can be corrected to substantially the same shape of the new one.

Figure 7:
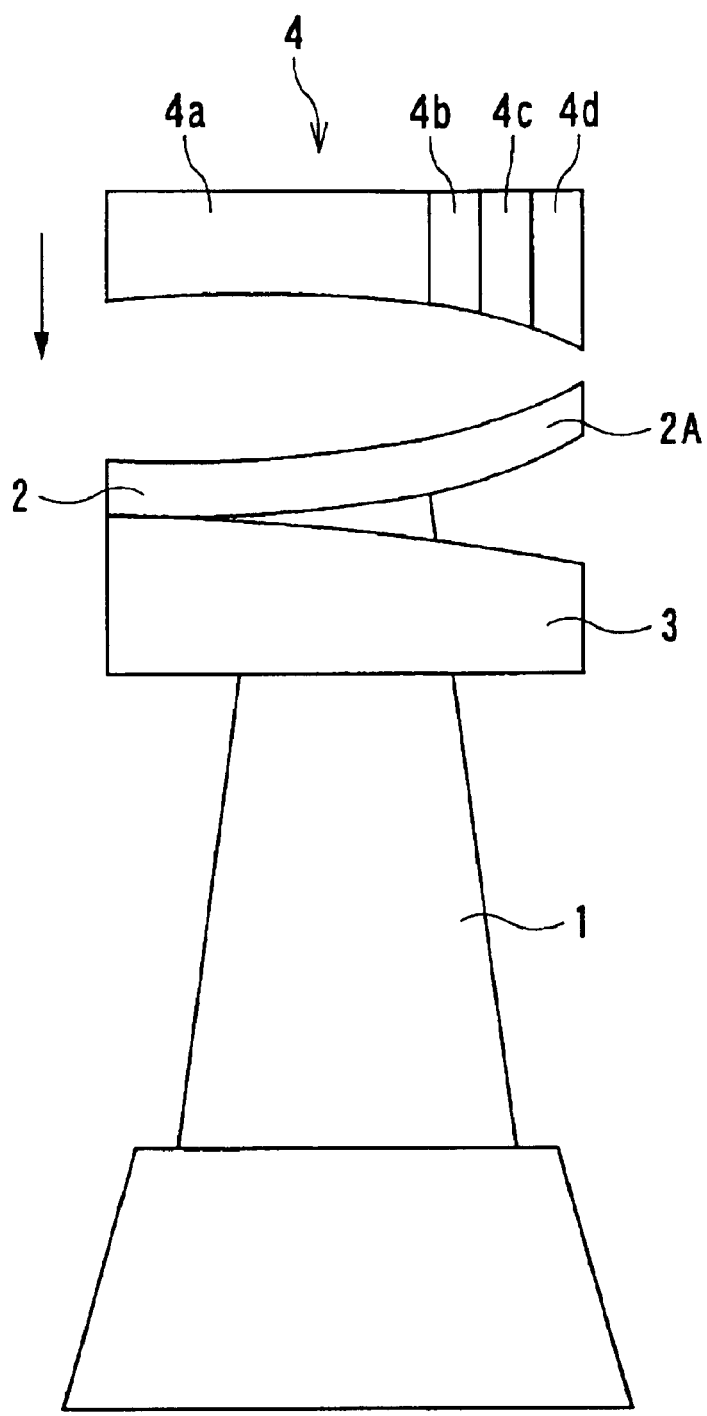
FIG. 7 is a view showing the structure of a deformation correcting section of the deformation correction apparatus for a gas turbine blade according to the second embodiment of the present invention.

The second embodiment of the present invention will be described hereunder with reference to FIG. 7 showing the structure of an essential portion of the deformation correction apparatus for a gas turbine blade. According to the second embodiment, the pressing die 4 is composed of divided two or more blocks (sections), unlike the first embodiment shown in FIG. 1. The respective blocks of the pressing die 4 are independently pressed against the tip shroud so as to correct the deformation.

As illustrated in FIG. 7, the gas turbine blade 1 is fixed by using the stationary die 3. The way to fix the stationary die 3 is the same as that of the first embodiment. In the second embodiment, the pressing die 4 is divided into two or more blocks. That is, the pressing die 4 is composed of a main section 4a, a first section 4b, a second section 4c and a third section 4d.

Figure 8:
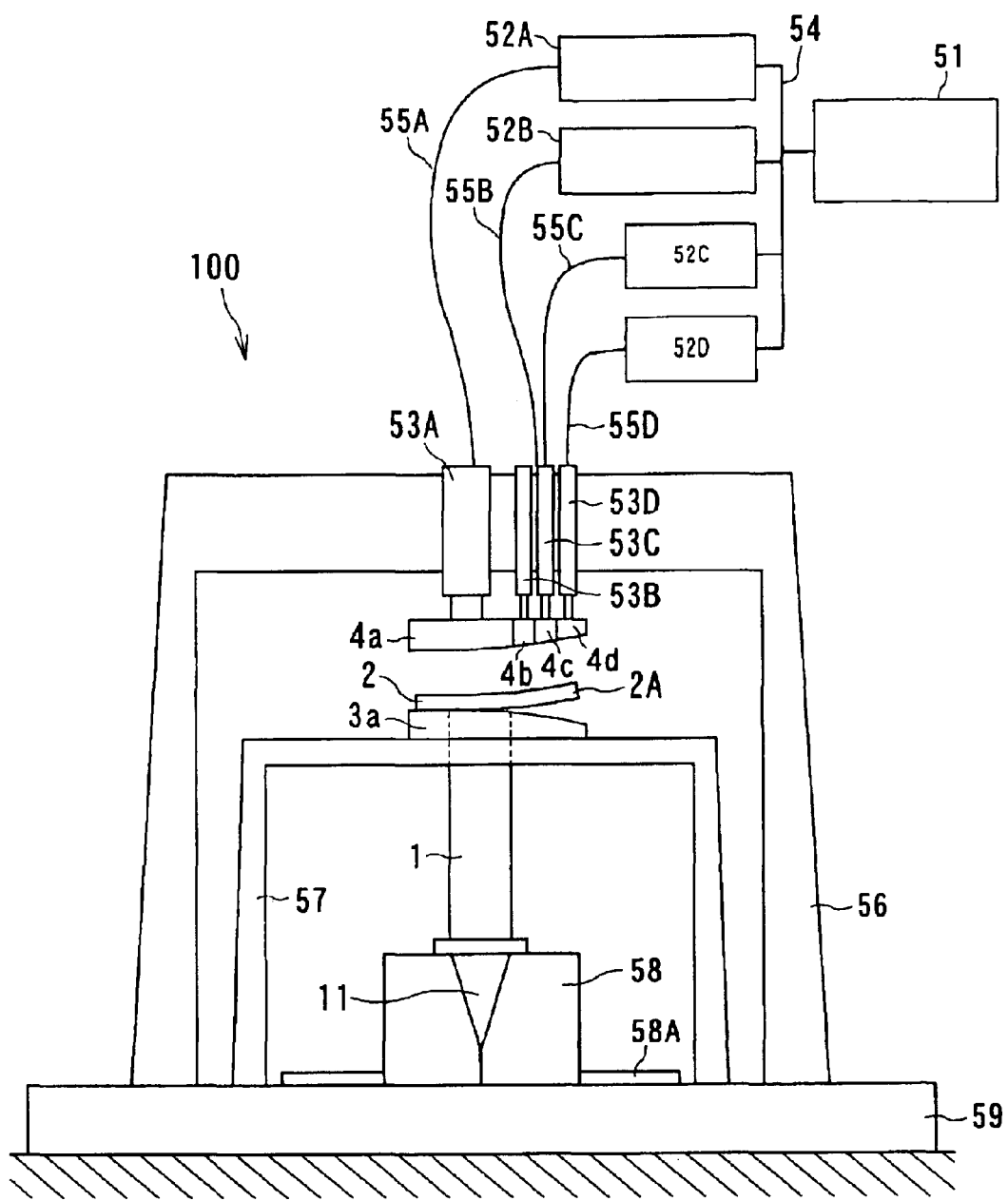
FIG. 8 is a schematic view showing an entire structure of the deformation correcting apparatus for a gas turbine blade according to the second embodiment of the present invention.

The entire structure of the deformation correction apparatus of this second embodiment is shown in FIG. 8, in which the same reference numerals are used to designate components identical to those of the first embodiment, and the overlapping explanation is omitted herein.

In the deformation correction apparatus of this second embodiment, a plurality of hydraulic cylinders 53 (53A to 53D) are arranged so as to independently drive the divided pressing die sections 4a to 4d, and in correspondence to this arrangement, a plurality of hydraulic pressure generators 52 (52A to 52D) are also arranged. The other structure is substantially the same as that of the first embodiment of FIG. 3.

By using the deformation correction apparatus of this embodiment, first, the main section 4a is actuated to press the relatively central portion of the deformed portion 2A of the tip shroud 2. In this state, the first die section 4b is pressed against the deformed portion. Further, in this state, second and third die sections 4c and 4d are pressed in succession. Therefore, the deformation from the distal end to the central portion of the deformed portion 2A is stepwise corrected. The pressing force is released after the pressing of all the die sections 4a to 4d, and the stationary die 3 is then removed, thus completing the deformation correcting process.

Further, in this second embodiment, in the control device 51, moment force acting to the boundary portion of the deformed portion 2A of the tip shroud 2 corresponding to the main and first die sections 4a and 4b is calculated, and the control signal is given to the cylinder 53B pressing the first die section 4b in consideration of this moment force so as not to cause any crack to the deformed portion 2A. Under the state, the second die section 4c is pressed, at which in the control device 51, moment force acting to the boundary portion of the deformed portion 2A of the tip shroud 2 corresponding to the first and second die sections 4b and 4c is calculated, and the control signal is given to the cylinder 53C pressing the second die section 4c in consideration of this moment force so as not to cause any crack to the deformed portion 2A. Furthermore, under this state, the third die section 4d is pressed, at which in the control device 51, moment force acting to the boundary portion of the deformed portion 2A of the tip shroud 2 corresponding to the second and third die sections 4c and 4d is calculated, and the control signal is given to the cylinder 53D pressing the third die section 4d in consideration of this moment force so as not to cause any crack to the deformed portion 2A.

According to the second embodiment, it is possible to correct the deformation without generating cracks even if a large deformation is generated in the distal end of the tip shroud 2. That is, when the large deformation is generated in the distal end of the tip shroud 2, if a non-divided pressing die 4 is used, a large deformation is initially generated in the distal end of the deformed portion. Thus, there is a possibility that a strain which may reach a breaking elongation will occur in the material of the gas turbine blade 1. This phenomenon will be further increased because of the denature of the blade surface because of the long time operation. On the contrary, in this second embodiment, the deformed portion is pressed from the proximal root portion to the distal end portion in succession by using the pressing die 4 having divided sections. Therefore, the load, i.e., moment force, is controlled with respect to the deformed portions corresponding to the respective die sections, and accordingly, the press correction does not concentrate on the distal portion, and hence, no crack occurs therein.

The third embodiment of the present invention will be described hereunder with reference to FIG. 9 and FIG. 10.

Figure 9:
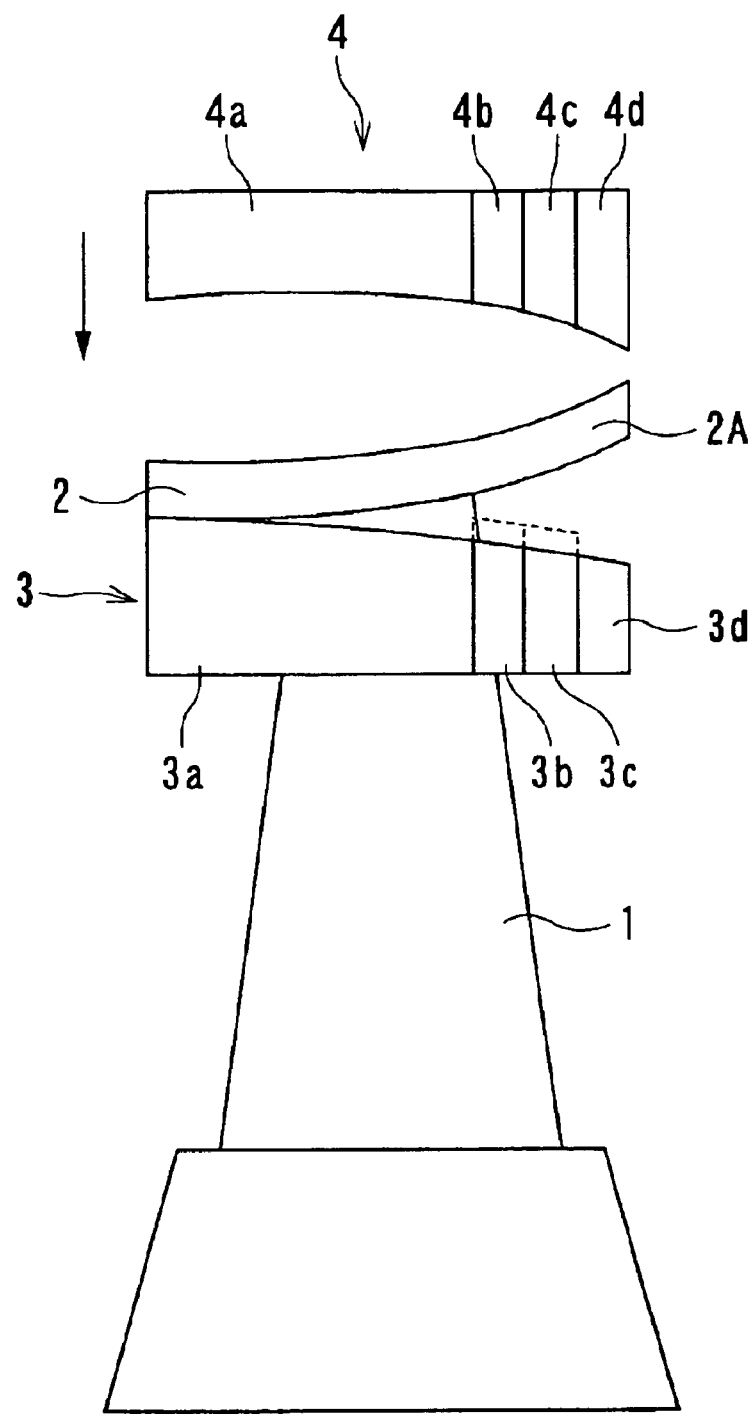
FIG. 9 is a view showing the structure of a deformation correcting section of the deformation correction apparatus for a gas turbine blade according to the third embodiment of the present invention.
Figure 10:
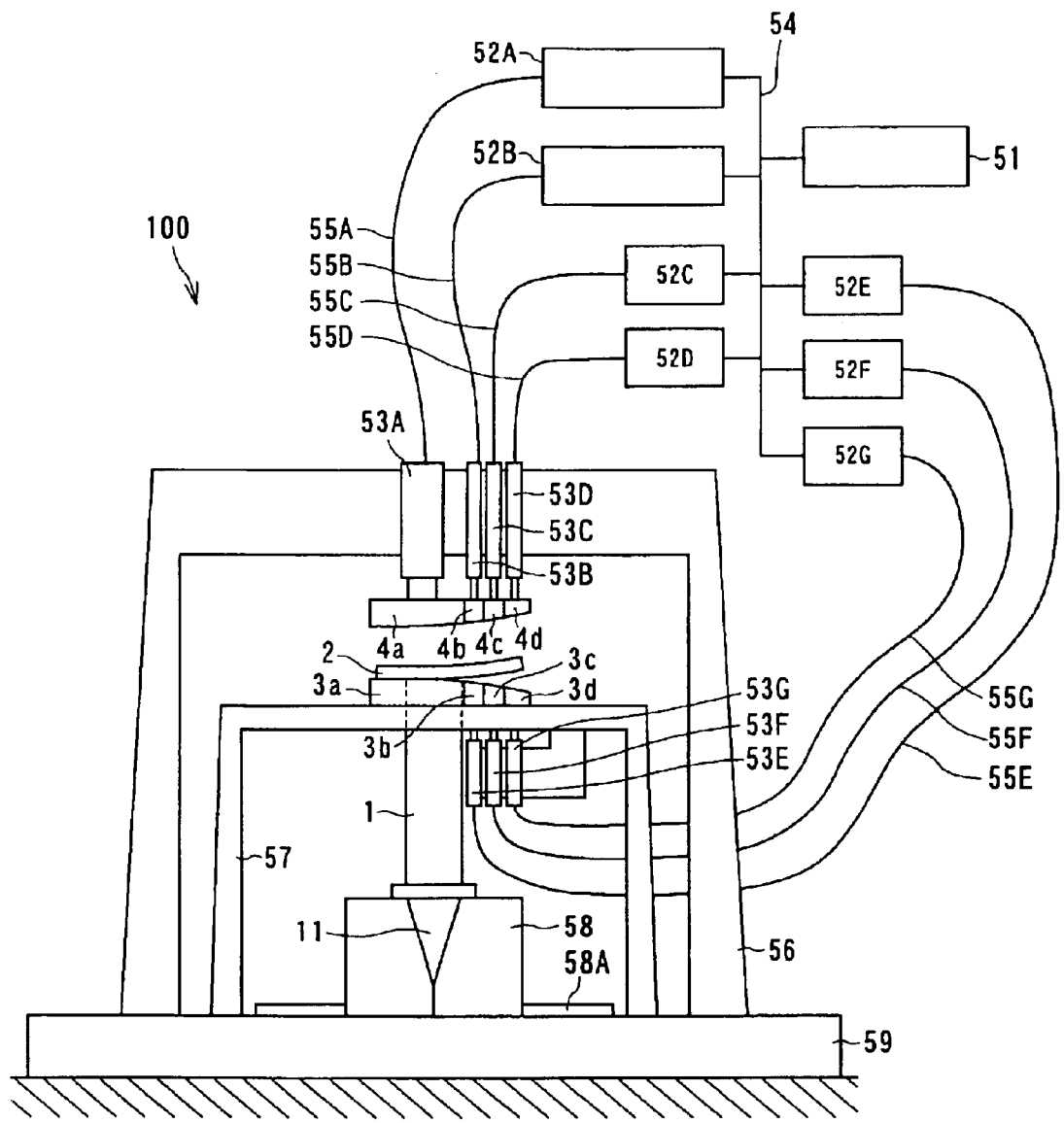
FIG. 10 is a schematic view showing an entire structure of the deformation correcting apparatus for a gas turbine blade according to the third embodiment of the present invention.

In the third embodiment, the stationary die 3 is divided into two or more blocks, in addition to the second embodiment shown in FIG. 9. Blocks, that is, die sections 3a to 3d are independently pressed against the back surface of the tip shroud 2 in succession to thereby correct the deformation of the tip shroud 2.

As shown in FIG. 9, the stationary die 3 and the pressing die 4 are individually divided into or composed of two or more blocks. In the embodiment of FIG. 9, the stationary die 3 is divided into four sections, that is, a stationary die main section 3a, a first die section 3b, a second die section 3c and a third die section 3d. On the other hand, as mentioned before, the pressing die 4 is divided into four sections, that is, a pressing die main section 4a, a first die section 4b, a second die section 4c and a third die section 4d.

In the deformation correction apparatus of this third embodiment, a plurality of hydraulic cylinders 53 (53E to 53G) are arranged so as to independently drive the divided stationary die sections 3b to 3d, and in correspondence to this arrangement, a plurality of hydraulic pressure generators 52 (52E to 52G) are also arranged. The other structure is substantially the same as that of the first embodiment of FIG. 8.

First, in a state that the stationary die sections 3a to 3d are kept at the normal position, the pressing die main section 4a is actuated to press against the relatively central portion of the deformed portion 2A of the tip shroud 2. In this state, the first (pressing) die section 4b is pressed. After being pressed, the first die section 4b is moved up so as to release the pressing force, while the first (stationary) die section 3b is moved up to the position shown by the broken line, that is, corresponding to the return amount due to the elastic deformation. Thereafter, the second pressing die section 4c is pressed against the tip shroud, and then, the second (pressing) die section 4c is moved up so as to release the pressing force. The second (stationary) die section 3c is moved up to the position shown by the broken line, that is, corresponding to the return amount due to the elastic deformation. Finally, the third (pressing) die section 4d is pressed against the tip shroud, and then, the third die section 4d is moved up so as to release the pressing force. According to the manner mentioned above, the deformation can be completely corrected. As described above, the position of the stationary die 3 after the correction is shifted from "the position subtracting the return from the shape after correction" to "the position of the shape after correction". Thus, the deformation has been corrected.

The control operation or mode of the control device 51 to the hydraulic mechanism including the hydraulic pressing devices 52B to 52D and the cylinders 53B to 53D for pressing the pressing die sections 4b to 4d are substantially the same as those of the second embodiment, so that the detail thereof is omitted herein.

According to the third embodiment, the tip shroud 2 is sectionally pressed, and therefore, it becomes possible to correct the deformation even with a low pressing ability. The tip shroud 2 is gradually corrected ranging from the central portion to the distal portion of the deformed portion 2A with the already deformed portion being fixed, so that the deformation does not become large, and no crack occurs therein.

In addition, the combination pattern of the divided dies may be changed, so that the various deformed shapes can be corrected correspondingly.

Figure 11:
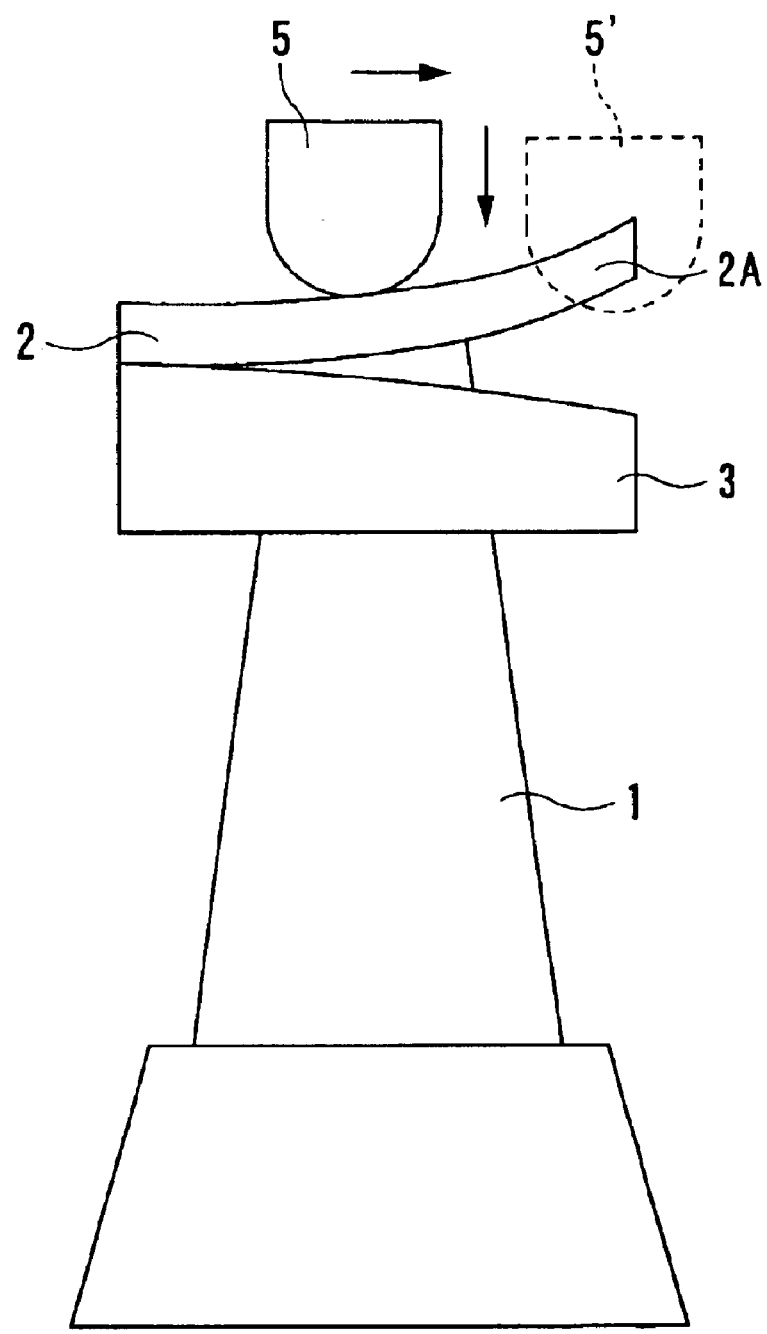
FIG. 11 is a view showing a structure of a deformation correcting section of the deformation correction apparatus for a gas turbine blade according to the fourth embodiment of the present invention.
Figure 12:
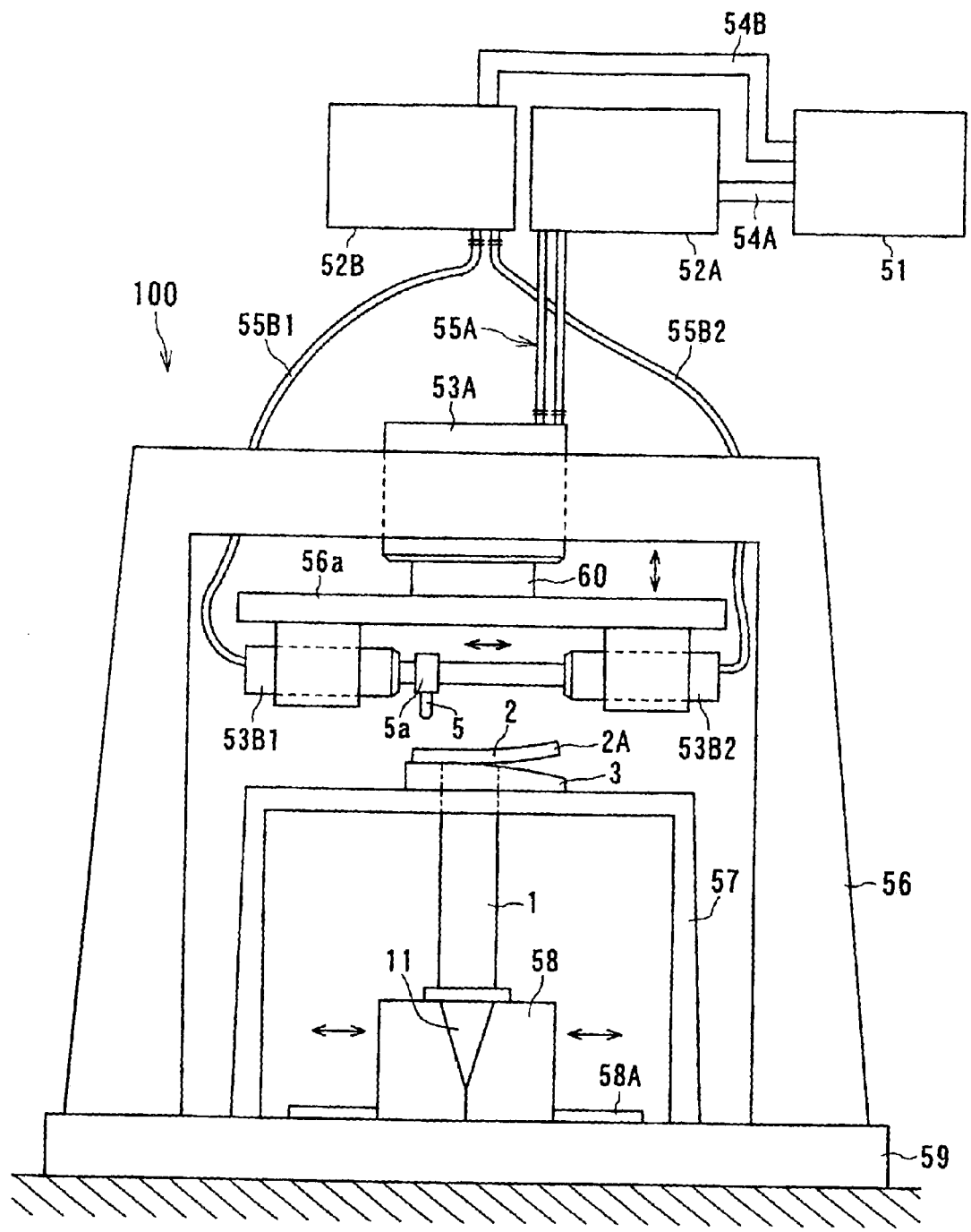
FIG. 12 is a schematic view showing an entire structure of the deformation correcting apparatus for a gas turbine blade according to the fourth embodiment of the present invention.

FIGS. 11 and 12 represent the fourth embodiment of the present invention.

According to the fourth embodiment, a small-sized pressing die 5, which is constructed to be movable, is used in place of the pressing die 4, unlike the first embodiment shown in FIG. 1. The movable pressing die 5 has a portion contacting the tip shroud 2 formed so as to provide a convex shape. The convex portion is pressed while contacting a portion of the surface of the tip shroud 2, and is gradually moved to the entire tip shroud 2 as the movable pressing die 5 is moved horizontally. Thus, the deformation of the tip shroud 2 is corrected.

With reference to FIG. 12 showing the entire structure of the deformation correction apparatus of this fourth embodiment, the movable pressing die 5 is mounted to a pressing die support structure 5a which is movable along the longitudinal direction of the blade tip shroud 2 by means of pistons of hydraulic cylinders 53B1 and 53B2 for horizontally moving the pressing die 5, the cylinders 53B1 and 53B2 being supported by a pressing column 56a provided to the front end of the piston 60 of the hydraulic cylinder 53A supported by the outside support column 56.

The respective hydraulic devices, i.e., cylinders, 53A, 53B1 and 53B2 are connected to the hydraulic pressure generators 52A and 52B, which are controlled and driven by the control device 51 in response to the control signals transmitted therefrom via signal buses 54A and 54B so as to output most suitable pressure (pressing force) and displacement to the deformed portion 2A of the blade tip shroud 2.

To the other structure, the same reference numerals are used to designate components identical to the first embodiment, and the overlapping explanation is omitted herein.

In the fourth embodiment, the shape of the small-sized movable pressing die 5 is different from the pressing die 4 of the first embodiment, and the downwardly convex portion is formed. The convex portion of the movable pressing die 5 has a shape contacting the portion of the tip shroud 2. The moving die 5 is moved from the proximal portion to the distal portion of the deformed portion 2A of the tip shroud 2 while being gradually pressed against the deformed portion 2A. In FIG. 11, a pressing die 5' shown by a broken line is the final press position of the movable pressing die 5 after being moved. In this manner, the pressing force is released after being pressed, and deformation correcting has been completed.

In a preferred example, it is desirable to move the pressing die 5 at a moving speed of 1 to 5 mm/sec. On the contrary, when moved at a speed lower than this moving speed, working time is merely elongated and no substantial effect for the deformation correction is obtainable, and when moved at a speed higher than that moving speed, the die 5 is moved before the completion of the plastic deformation, resulting in bad deformation correction efficiency. Further, it may be possible to be moved in a repeated manner from the root position to the distal end position of the deformed portion 2A. In this operation, it is necessary to pay an attention to start the moving from the root position towards the distal end position of the deformed tip shroud portion 2A. If the repeated moving is started from an intermediate position, difference in strength is caused to portions of the tip shroud 2, resulting in damage on use life thereof.

According to this fourth embodiment, one movable pressing die 5 presses the deformed portion 2A of the tip shroud 2 ranging from the central portion to the distal end portion. Therefore, any complicate divided die is not required. Even if the gas turbine blade 1 has different tip shroud shape, one movable pressing die 5 of this structure is applicable without changing the shape of the pressing die 5 as far as it has a relatively similar shape.

Figure 13:
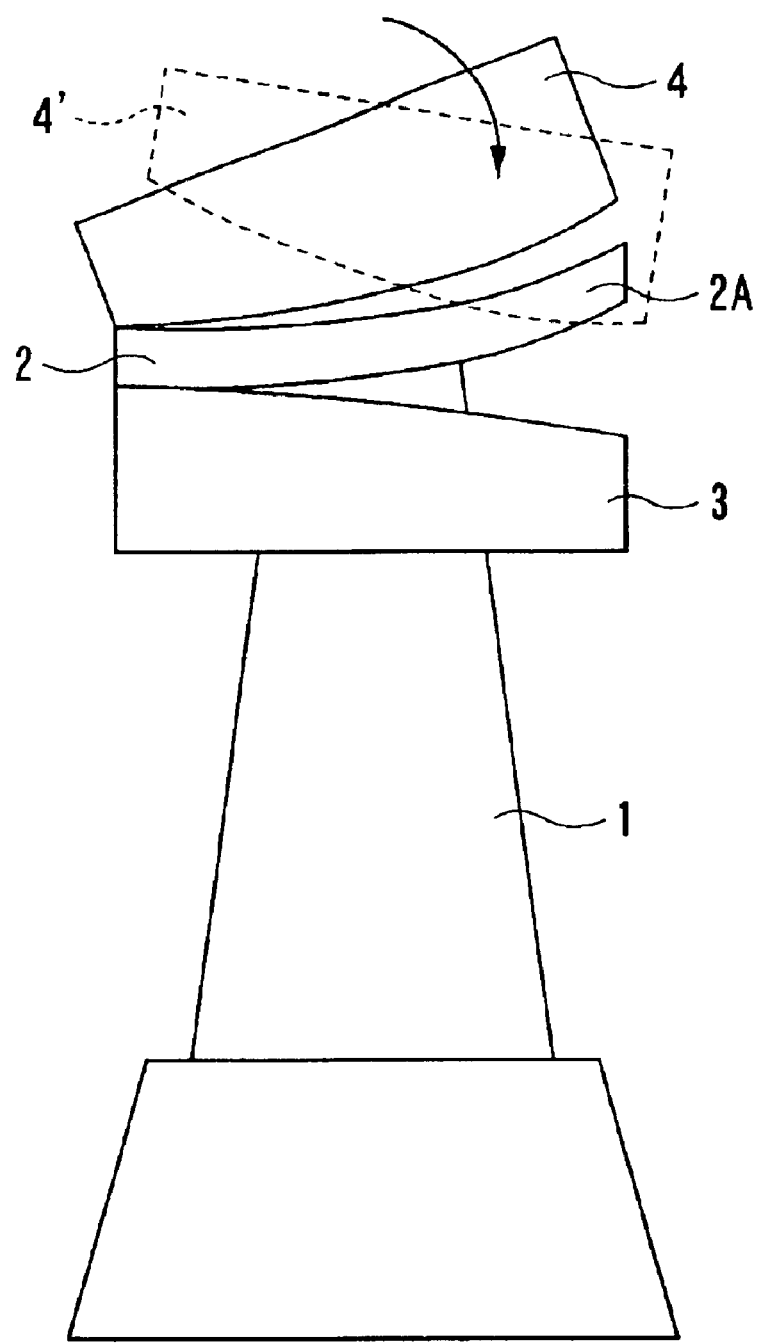
FIG. 13 is a view showing a structure of a deformation correcting section of the deformation correction apparatus for a gas turbine blade according to a fifth embodiment of the present invention.

The fifth embodiment of the present invention will be described below with reference to FIG. 13 showing the structure of an essential portion of the deformation correcting apparatus for a gas turbine blade.

In the fifth embodiment, the surface of the pressing die 4 contacting the tip shroud 2 is formed into a shape of convex surface, unlike the first embodiment shown in FIG. 1. The loading position of the pressing die 4 is gradually moved so as to gradually move the convex surface along the position contacting the tip shroud surface. Therefore, the deformation of the tip shroud 2 is also corrected by this fifth embodiment. The same reference numerals are used to designate components identical to the first embodiment, and the overlapping explanation is omitted.

According to this embodiment, as illustrated in FIG. 13, the gas turbine blade 1 is fixed by using the stationary die 3. The way to fix the stationary die 3 is the same as that of the first embodiment. In the fifth embodiment, the pressing die 4 is not moved to the lateral direction and formed to provide the convex surface so as to press against the deformed portion 2A.

That is, the pressing die 4 is first pressed against the tip shroud 2 so as to contact the central portion. Thereafter, the press loading position of the pressing die 4 is gradually shifted to the distal end portion of the deformed portion 2A, and accordingly, the contact surface of the pressing die 4 with respect to the deformed portion 2A of the tip shroud 2 gradually changes. Finally, the pressing is carried out by the position of the die 4' shown by a broken line. Thereafter, the press is released, and the deformation correction has been completed.

According to the fifth embodiment, the press loading position applied to the pressing die 4 is gradually shifted to successively press the deformed portion 2A from the proximal portion to the distal portion. Therefore, the press correction does not concentrate on the distal end portion, and no crack occurs therein. In addition, since the pressing die 4 is not moved in the horizontal direction, rubbing scratches or like are hard to occur in the pressed portion during the movement.

Figure 14:
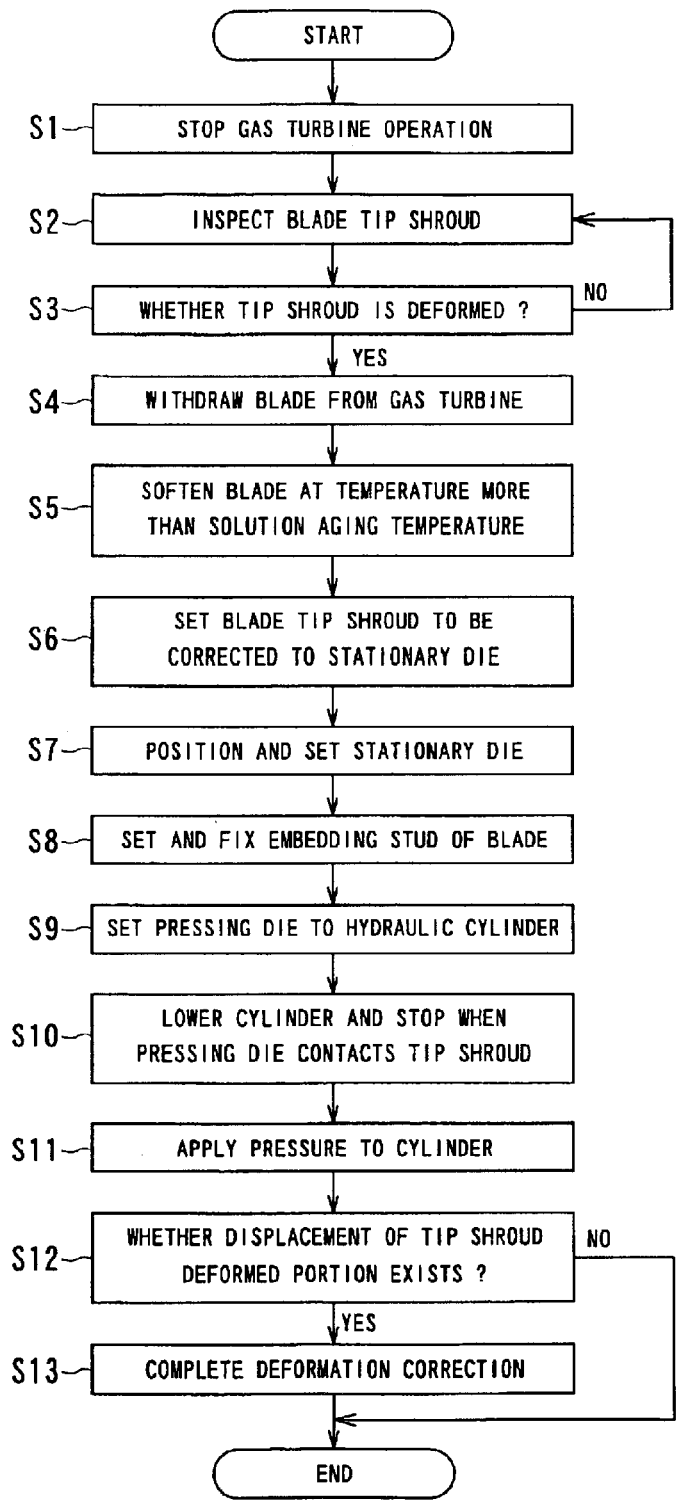
FIG. 14 is a flowchart showing steps of a deformation correcting method for a gas turbine blade according to another aspect of the present invention.

Hereunder, the gas turbine blade deformation correction method according to another embodiment of the present invention is carried out by utilizing the deformation correction apparatus 100 of the first embodiment shown in FIG. 3, for example, and will be described with reference to the flowchart of FIG. 14.

In a case where a gas turbine equipped with a blade tip shroud 2 having a deformed portion 2A has been continuously driven, an adverse phenomenon such as abnormal vibration or power lowering will occur. Therefore, it is necessary to carry out a periodical inspection to monitor the operating state.

Usually, in the use of the deformation correction apparatus 100 of the characters mentioned above, the turbine blades are subjected to the deformation correction working one by one by setting the deformation correction apparatus, and for this reason, it is first necessary to stop the operation of the gas turbine plant (step S1).

Then, the deformed condition of the tip shroud portion is visually inspected one by one (step S2). In the case of no deformation or slight deformation which requires no specific correction working, the blade in the next stage is inspected (step S3).

In the case of finding the deformed one, it is withdrawn from the gas turbine shaft (step S4). The withdrawn gas turbine blade is degraded in its quality or material and its ductility because of long-term use thereof in a sever condition. In such a case, a heat-softening treatment is performed (step S5) by putting and heating the blade in a vacuum furnace or locally heating a portion near the deformed portion through a high-frequency induction heating process. In such heating treatment, the heating temperature depends on the material of the blade, and in usual, this heating temperature is set to a temperature more than that required for fusing the material.

Next, the turbine blade is set to the stationary die 3 of the deformation correction apparatus 100 (step S6) and positioned and fixed thereto (step S7). The stud portion 11 of the blade 1 is then fixed (step S8). According to these steps, the blade is firmly fixed to the deformation correction apparatus 100, and the pressure in the deformation correction working time is not applied to the entire blade.

The pressing die 4 is set to the hydraulic cylinder 53 of the deformation correction apparatus 100 (step S9). The stationary die 3 and the pressing die 4 having preliminary determined shapes are used in view of the preliminary observation of the deformed condition, the past correction working data, past experiment data and so on.

In the next step (step S10), the hydraulic cylinder to which the pressing die 4 is mounted is lowered to a position at which it contacts the deformed portion 2A of the tip shroud 2 of the blade 1. This step S10 is performed for the reason of determining a reference position for collecting, as data, relationship between the displacement of the deformed portion or pressure of the cylinder and the actual displacement of the deformed portion and for the reason of avoiding an occurrence of a crack to the material due to the rapid or violent deformation correction working. Next, a pressure is applied to the hydraulic cylinder 53 to press the deformed portion 2A of the tip shroud between the stationary die 3 and the pressing die 4 (step S11). In this step, the pressure of the cylinder 53 and the actual displacement of the pressing die 4 are transmitted to the control device 51 as feedback data.

In this step, the pressure to be applied to the hydraulic cylinder 53 and the displacement of the deformed portion of the tip shroud 2 are monitored and it is discriminated whether the displacement of the deformed portion 2A of the tip shroud 2 exist or not (step S12). In the case where it is discriminated that the preliminarily determined displacement of the deformed portion is obtained together with the pressure, it is judged that the correction is completed and then the correction working is ended. On the other hand, in the case of no displacement of the tip shroud even in the increasing of the cylinder pressure or obtaining a displacement data extremely different from the past data, it is judged that some abnormal portion exists and the correction working is interrupted (step S13). In such case, the deformation corrected blade is removed from the deformation correction apparatus and a new blade to be corrected is set to the apparatus and new correction is started from the step S6.

Further, as occasion demands, an HIP material regeneration treatment may be performed after the deformation correction working to regenerate the material of the whole blade, and in addition, a solution annealing and aging heat treatment suitable for the material of the gas turbine blade may be further carried out.

According to the blade deformation correction method of this embodiment, the tip shroud is softened before the correction of the deformation of the tip shroud, thus occurring no crack therein. In addition, at a time when the deformation of the tip shroud is corrected, a micro defect occurs in the inside of the tip shroud. Even if the foregoing micro defect occurs, the defect could be eliminated in the HIP material regeneration after the correction of the deformation, thus safety being secured.

As described hereinbefore, according to the present invention, it is possible to simply correct the deformation of the tip shroud of the gas turbine blade without generating cracks. The deformation of the tip shroud is simply corrected, so that the gas turbine blade after operation can be recycled without newly using an expensive gas turbine blade and adjusting the arrangement of the gas turbine blade.

What is claimed is:

1. An apparatus for correcting deformation of a gas turbine blade comprising:

a stationary die fixed to a backside of a tip shroud of a gas turbine blade to hold a back surface thereof when deformation of the tip shroud of a gas turbine blade is corrected;

a pressing die pressing a front surface of the tip shroud so as to press the tip shroud of the blade between the pressing die and the stationary die;

a supporting mechanism for supporting the stationary die with respect to the pressing die;

a hydraulic drive mechanism connected to the pressing die and including pressure generator for pressing the pressing die against the tip shroud held by the stationary die; and a control device operatively connected to the hydraulic drive mechanism and adapted to set and indicate a driving condition on a basis of deformation correction data preliminarily stored in the control device, wherein the surface of the stationary die contacting the tip shroud of the blade has a shape subtracting a return amount from a shape of the tip shroud after the correction of the deformation, and a surface of the pressing die contacting the tip shroud has a shape adding the return amount to the shape of the tip shroud after the correction of the deformation.

2. The deformation correction apparatus according to claim 1, wherein the preliminarily stored data includes data of pressure and displacement to be outputted to the pressure generator of the hydraulic drive mechanism, said control device includes a pressure operating means and a displacement operating means, and said return amounts are operated and set by the pressure operating means and the displacement operating means based on a predetermined data with a position of the pressing die contacting the deformed portion of the tip shroud being a reference position.

3. The deformation correction apparatus according to claim 1, wherein the pressing die is composed of a plurality of divided sections, and said pressure generator includes a plurality of pressing devices corresponding to the divided sections of the pressing die so as to press the respective divided sections independently in accordance with setting conditions set for the divided sections, respectively successively.

4. The deformation correction apparatus according to claim 3, wherein said stationary die is composed of a plurality of divided sections so as to correspond to the divided sections of the pressing die, said hydraulic drive mechanism further includes a pressure generator including a plurality of pressing devices corresponding to the divided sections of the stationary die so as to press the respective divided sections thereof independently in accordance with setting conditions set for the divided sections, respectively successively.

5. The deformation correction apparatus according to claim 1, wherein the pressing die has a convex portion contacting the tip shroud and said hydraulic drive mechanism includes a pressure generator for pressing the pressing die so that the convex portion contacts a portion of the tip shroud of the blade and also includes a moving device for horizontally moving the pressing die along an entire surface of the tip shroud while being pressed to thereby correct the deformation of the tip shroud during the movement.

6. The deformation correcting apparatus according to claim 1, wherein the pressing die contacting the tip shroud has a convex surface and the hydraulic drive mechanism includes a pressure generator for pressing the pressing die so that the pressing surface thereof rolls along an entire surface of the tip shroud by moving a loading point of the pressing die against the tip shroud surface.

7. An apparatus for correcting deformation of a gas turbine blade comprising:

a stationary die fixed to a backside of a tip shroud of a gas turbine blade to hold a back surface thereof when deformation of the tip shroud of a gas turbine blade is corrected;

a pressing die pressing a front surface of the tip shroud so as to press the tip shroud of the blade between the pressing die and the stationary die;

a supporting mechanism for supporting the stationary die with respect to the pressing die;

a hydraulic drive mechanism connected to the pressing die and including pressure generator for pressing the pressing die against the tip shroud held by the stationary die; and a control device operatively connected to the hydraulic drive mechanism and adapted to set and indicate a driving condition on a basis of deformation correction data preliminarily stored in the control device, wherein the pressing die comprises a plurality of divided sections, and said pressure generator includes a plurality of pressing devices corresponding to the divided sections of the pressing die so as to press the respective divided sections independently in accordance with setting conditions set for the divided sections, respectively successively.

8. The deformation correction apparatus according to claim 7, wherein said stationary die is composed of a plurality of divided sections so as to correspond to the divided sections of the pressing die, said hydraulic drive mechanism further includes a pressure generator including a plurality of pressing devices corresponding to the divided sections of the stationary die so as to press the respective divided sections thereof independently in accordance with setting conditions set for the divided sections, respectively successively.

9. The deformation correction apparatus according to claim 7, wherein the pressing die has a convex portion contacting the tip shroud and said hydraulic drive mechanism includes a pressure generator for pressing the pressing die so that the convex portion contacts a portion of the tip shroud of the blade and also includes a moving device for horizontally moving the pressing die along an entire surface of the tip shroud while being pressed to thereby correct the deformation of the tip shroud during the movement.

10. The deformation correcting apparatus according to claim 7, wherein the pressing die contacting the tip shroud has a convex surface and the hydraulic drive mechanism includes a pressure generator for pressing the pressing die so that the pressing surface thereof rolls along an entire surface of the tip shroud by moving a loading point of the pressing die against the tip shroud surface.

11. An apparatus configured to correct deformation, comprising:
- a first die configured to contact a first surface of a tip shroud of a turbine blade during deformation correction;
- a second die configured to contact a second surface of the tip shroud during deformation correction;
- a drive mechanism configured to move one of the first and the second dies to press the tip shroud between the first and second dies; and
- a control device configured to control the drive mechanism based on deformation correction data stored in the control device,
- wherein the first die has a concave shape and the second die has a convex shape corresponding to the concave shape.

12. The apparatus according to claim 11, wherein the first die has a first surface including the concave shape, the second die has a second surface including the convex shape, and the concave and convex shapes are configured to bend the tip shroud beyond a position of the tip shroud after removal of the tip shroud from between the first and second dies.

* * * * *